(12) United States Patent
Anand et al.

(10) Patent No.: US 10,496,248 B2
(45) Date of Patent: *Dec. 3, 2019

(54) DISK UTILIZATION ANALYSIS

(71) Applicant: INTERNATIONAL BUSINESS MACHINES CORPORATION, Armonk, NY (US)

(72) Inventors: Vishal Anand, Katihar (IN); Sahadev Dey, Bangalore (IN); Rajneesh Kumar, Bangalore (IN); Vijay S. Patil, Bangalore (IN); Amit Patra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,615

(22) Filed: Aug. 13, 2018

(65) Prior Publication Data

US 2018/0348973 A1 Dec. 6, 2018

Related U.S. Application Data

(63) Continuation of application No. 15/790,250, filed on Oct. 23, 2017, now Pat. No. 10,073,594, which is a (Continued)

(51) Int. Cl.
*G06F 3/0482* (2013.01)
*G06F 3/0484* (2013.01)
*G06F 16/11* (2019.01)

(52) U.S. Cl.
CPC ........ *G06F 3/0482* (2013.01); *G06F 3/04842* (2013.01); *G06F 16/122* (2019.01)

(58) Field of Classification Search
CPC .............................. G06F 3/0482; G06F 16/122
See application file for complete search history.

(56) References Cited

U.S. PATENT DOCUMENTS 5,649,095 A 7/1997 Cozza
7,694,188 B2 4/2010 Raghuraman et al.
(Continued)

FOREIGN PATENT DOCUMENTS

CN 102141942 8/2011
CN 102461075 5/2012
KR 20070081616 8/2007

OTHER PUBLICATIONS

Delgado, Eduardo; Using the RTVDSKINF command to avoid disk storage disasters on IBM i; Aug. 2, 2012; URL: http://www.ibm.com/developerworks/ibmi/library/i-using-rtvdskinf-command/index.html?ca=dat; 13 pages.
(Continued)

*Primary Examiner* — Mohammad S Rostami
(74) *Attorney, Agent, or Firm* — Schmeiser, Olsen & Watts; Mark C. Vallone

(57) ABSTRACT

An approach is provided for monitoring disk utilization at an object level. At a first time a first size of an object in a System i computing platform is determined by calling an application programming interface (API). At a second time a second size of the object is determined by calling the API. A difference between the first and second sizes is determined. The difference is determined to be greater than a threshold. Based on the difference exceeding the threshold, an alert is sent indicating growth at the object level rather than at an auxiliary storage pool level. The API is called to obtain the sizes of objects in an integrated file system in the System i computing platform. Differences between the sizes of the objects at a user-entered start date and the current time are determined and presented. A report including the differences is generated and sent.

13 Claims, 9 Drawing Sheets

Related U.S. Application Data continuation of application No. 14/597,551, filed on Jan. 15, 2015, now Pat. No. 9,823,814.

(56) References Cited

U.S. PATENT DOCUMENTS

| | | | |
|---|---|---|---|
| 7,953,701 B2 | 5/2011 | Okitsu et al. | |
| 8,171,414 B2 | 5/2012 | Hackworth | |
| 8,315,995 B1 | 11/2012 | Levy | |
| 9,823,814 B2 | 11/2017 | Anand et al. | |
| 2007/0277011 A1 | 11/2007 | Tanaka et al. | |
| 2007/0283091 A1 | 12/2007 | Nagae et al. | |
| 2009/0271445 A1 | 10/2009 | Emaru et al. | |
| 2010/0100677 A1 | 4/2010 | McKean et al. | |
| 2010/0250882 A1 | 9/2010 | Hutchison et al. | |
| 2014/0075138 A1 | 3/2014 | Doster et al. | |
| 2014/0236902 A1 | 8/2014 | Zhu et al. | |
| 2014/0351808 A1 | 11/2014 | Srinivasan | |
| 2015/0046653 A1 | 2/2015 | Soundararajan et al. | |
| 2016/0210303 A1 | 7/2016 | Anand et al. | |
| 2018/0046332 A1 | 2/2018 | Anand et al. | |

OTHER PUBLICATIONS

DiskPulse, Disk Change Monitor User Manual, Version 63; Flexense Ltd.; May 2014; 64 pages.

Gordon, Whitson; The Best Disk Space Analyzer for Windows; retrieved from the Internet Jul. 30, 2014, URL: http://lifehacker.com/5915921/the-best-disk-space-analyzer-for-windows; 6 pages.

Office Action German Patent Office dated Nov. 21, 2016; Aktenzeichen 10 2016 100 034.5; Applicant: International Business Machines Corporation; 9 pages.

Office Action; China Patent Office; dated Nov. 28, 2017; 6 pages.

Programmierschnittstelle; retrieved from the Internet Nov. 21, 2016; URL: https://de.wikipedia.org/w/index.php?title=Programmierschnittstelle&oldid=137404799; 2 pages. English Translation—Programming Interface; Google translate Jan. 31, 2017; 1 page.

Syta, James M.; List of IBM Patents or Patent Applications Treated as Related; Aug. 13, 2018; 1 page.

Xu Kun et al.; Research in Monitoring Performance of Disk in Windows NT System; Computer Science vol. 39, No. 11A; Nov. 2012; pp. 301-304.

LIBRARY SIZE COMPARISON

Start Date: 10/08/14
End Date: 19:05:22

OPTIONS:  1=Details of a Library  Start Date: 100614
          2=Details of Objects in a Library  End Date: 100714

| Library | Start Date | Library Size in 1000 Bytes End Date | Difference | % Difference |
|---|---|---|---|---|
| DASDLIB1 | 49,975 | 56,422 | 6,447 | 12.90 |
| QIBM | 5,971,968 | 6,471,204 | 499,236 | 8.35 |
| QMGTC2 | 36,052 | 36,085 | 33 | .09 |
| QSYS2 | 53,407 | 53,415 | 8 | .01 |
| #A01JRN | 66,748 | 66,748 | 0 | .00 |
| #A01JR01@R | 17,453 | 17,453 | 0 | .00 |
| #A02JRN | 69,545 | 69,545 | 0 | .00 |
| #A02JR01@R | 4,685 | 4,685 | 0 | .00 |
| #A03JRN | 276,512 | 276,512 | 0 | .00 |
| #A03JR01@R | 5,935 | 5,935 | 0 | .00 |
| #A04JRN | 30,597 | 30,597 | 0 | .00 |

REAL TIME LIBRARY SIZE COMPARISON

Start Date: 10/08/14
19:05:22
100614

OPTIONS: 1=Details of a Library
2=Details of Objects in a Library

| Library | Library Size in 1000 Bytes | | | % Difference |
|---|---|---|---|---|
| | Start Date | End Date | Difference | |
| QUSRSYS | 210,284 | 616,570 | 406,286 | 193.20 |
| QTEMP | 81 | 98 | 17 | 20.98 |
| QIBM | 5,971,968 | 6,938,181 | 966,213 | 16.17 |
| DASDLIB1 | 49,975 | 56,602 | 6,627 | 13.26 |
| QSPL | 169,943 | 170,278 | 335 | .19 |
| QMGTC2 | 36,052 | 36,085 | 33 | .09 |
| QRPLOBJ | 212,488 | 212,635 | 147 | .06 |
| QSYS2 | 53,407 | 53,440 | 33 | .06 |
| QSYS | 2,952,354 | 2,952,748 | 394 | .01 |
| #A01JRN | 66,748 | 66,748 | 0 | .00 |
| #A01JR01@R | 17,453 | 17,453 | 0 | .00 |

DIRECTORY SIZE COMPARISON                          10/08/14
                                                    09:00:55

Start Date:   100614
                                     End Date:     100714

Directory Size in MB
Directory     Start Date   End Date   Difference   % Difference
ERRORS             49         50          1            2.04
QSYS_371827      1280       1288          8             .62
QSYS_371828      1280       1287          7             .54
QSYS_371826      1306       1313          7             .53
brms             1041       1042          1             .09
hmc              2323       2323          0             .00
downloads           8          8          0             .00
httpcollector      17         17          0             .00
test             1818       1818          0             .00
webapps            10         10          0             .00

*FIG. 6*

REAL TIME DIRECTORY SIZE COMPARISON

Start Date: 10/08/14 19:22:27

100614

| DIRECTORY | Start Date | Size in MB End Date | Difference | % Difference |
|---|---|---|---|---|
| ERRORS | 49 | 53 | 4 | 8.16 |
| QSYS_371826 | 1306 | 1383 | 77 | 5.89 |
| QSYS_371827 | 1280 | 1353 | 73 | 5.70 |
| QSYS_371828 | 1280 | 1349 | 69 | 5.39 |
| brms | 1041 | 1050 | 9 | .86 |
| hmc | 2323 | 2323 | 0 | .00 |
| downloads | 8 | 8 | 0 | .00 |
| httpcollector | 17 | 17 | 0 | .00 |
| test | 1818 | 1818 | 0 | .00 |
| webapps | 10 | 10 | 0 | .00 |

*FIG. 7*

DISK UTILIZATION ANALYSIS

CROSS REFERENCE TO RELATED APPLICATIONS

This application is a continuation application claiming priority to Ser. No. 15/790,250 filed Oct. 23, 2017, which is a continuation application claiming priority to Ser. No. 14/597,551 filed Jan. 15, 2015 now U.S. Pat. No. 9,823,814 issued Nov. 21, 2017, the contents of which are hereby incorporated by reference.

TECHNICAL FIELD

The present invention relates to managing utilization of computer resources, and more particularly to automatic object level monitoring of disk utilization.

BACKGROUND

Known disk utilization monitoring techniques for systems running the IBM i operating system utilize auxiliary storage pool (ASP)-level monitoring. An ASP is a group of disk drives in a System i® (also known as iSeries®) platform. The grouping of disk drives in an ASP organizes data to limit the impact of storage device failures and to reduce recovery time. If a disk failure occurs, only the data in the ASP containing the failed unit needs to be recovered. ASPs may also isolate objects with similar performance attributes, thereby improving performance. In the System i® platform, it is typical for all disk drives to be assigned to a single ASP. The System i® and iSeries® platforms are computer system platforms offered by International Business Machines Corporation located in Armonk, N.Y. System i® and iSeries® are registered trademarks of International Business Machines Corporation.

ASP-level monitoring tracks an increase in size of disk utilization at the level of the ASP, but not at the level of an actual library or object created on top of the ASP. Known monitoring of disk utilization at the ASP level is a manual approach, which includes logging onto the System i® ASP to analyze which library or object caused the monitored increase in the size of the ASP.

Generating a spooled disk utilization report using the known disk utilization monitoring techniques takes a significant amount of time, typically four to 17 hours, thereby making real time disk utilization data unavailable. Generating the disk utilization report use the PRTDIRINF/RTVDIRINF commands and/or the PRTDSKINF/RTVDSKINF commands. The PRTDIRINF (also known as (a.k.a.) Print Directory Information) command prints attributes of objects in the integrated file system, where the attributes of the objects are collected by the RTVDIRINF (a.k.a. Retrieve Directory Information) command. The PRTDSKINF (a.k.a. Print Disk Information) command prints disk space information that was stored in a database file by the RTVDSKINF (a.k.a. Retrieve Disk Information) command.

Because of the significant amount of time to generate the disk utilization report using known techniques, the analysis of the disk utilization data must be delayed, which increases a risk of outages or failure to obtain objectives of service level agreements.

BRIEF SUMMARY

In a first embodiment, the present invention provides a method of monitoring disk utilization at an object level. The method includes a computer determining at a first time a first size of an object in a System i® platform by calling an application programming interface (API). The object is (1) an object in an integrated file system (IFS) or (2) a library that includes other objects which are named storage spaces in the System i® platform. The method further includes the computer determining at a second time a second size of the object by calling the API. The second time is subsequent to the first time and the second size is greater than the first size. The method further includes the computer determining a difference between the first and second sizes. The method further includes the computer determining the difference exceeds a threshold difference. The method further includes based on the difference exceeding the threshold difference, the computer sending an alert about the object having a growth in size that exceeds the threshold difference. The alert indicates the growth at a level of the object, which is different from a growth at a level of an auxiliary storage pool in the System i® platform.

In a first aspect of the present invention, the steps of determining the first size of the object and the second size of the object do not employ the commands RTVDSKINF, PRTDSKINF, RTVDIRINF, or PRTDIRINF.

In a second aspect of the present invention, the method further includes the computer periodically and automatically monitoring sizes of objects in the IFS, which determines sizes of the objects in the IFS at multiple dates, and which stores the sizes of the objects in the IFS at multiple dates in a data repository. The method further includes the computer receiving via an interface a selection by a user of a comparison of sizes of the objects in the IFS at a start date and an end date. The method further includes the computer receiving via the interface the start date and the end date entered by the user. The start and end dates are included in the multiple dates. The method further includes the computer retrieving from the data repository the sizes of the objects at the start and end dates. The method further includes the computer determining differences between the sizes of the objects at the start date and respective sizes of the objects at the end date. The method further includes the computer presenting the differences and the sizes of the objects at the start and end dates. The method further includes the computer generating and sending a report that includes the differences and the sizes of the objects at the start and end dates.

In a third aspect of the present invention, the method further includes the computer periodically and automatically monitoring sizes of libraries in the System i® platform, which determines sizes of the libraries at multiple dates, and which stores the sizes of the libraries at the multiple dates in a data repository. The method further includes the computer receiving via an interface a selection from a user of a comparison of sizes of the libraries at a start date and an end date. The method further includes the computer receiving via the interface the start date and the end date entered by the user. The start and end dates are included in the multiple dates. The method further includes the computer retrieving from the data repository the sizes of the libraries at the start and end dates. The method further includes the computer determining differences between the sizes of the libraries at the start date and respective sizes of the libraries at the end date. The method further includes the computer presenting the differences and the sizes of the objects at the start and end dates. The method further includes the computer generating and sending a report that includes the differences and the sizes of the objects at the start and end dates.

In a fourth aspect of the present invention, the method further includes the computer receiving via an interface a selection by a user of a real time comparison of sizes of objects in an integrated file system (IFS) in the System i® platform at a start date and a current time. The method further includes the computer receiving via the interface the start date entered by the user. The method further includes the computer calling an application programming interface (API) in the System i® platform, which obtains the sizes of the objects at the start date and the current time. The method further includes the computer determining differences between the sizes of the objects at the start date and respective sizes of the objects at the current time. The method further includes the computer presenting the differences and the sizes of the objects at the start date and the current time. The method further includes the computer generating and sending a report that includes the differences and the sizes of the objects at the start date and the current time.

In a fifth aspect of the present invention, the method further includes the computer receiving via an interface a selection from a user of a real time comparison of sizes of libraries at a start date and a current time. The method further includes the computer receiving via the interface the start date entered by the user. The method further includes the computer calling an application programming interface (API) in the System i platform, which obtains the sizes of the libraries at the start date and the current time. The method further includes the computer determining differences between the sizes of the libraries at the start date and respective sizes of the libraries at the current time. The method further includes the computer presenting the differences and the sizes of the objects at the start date and the current time. The method further includes the computer generating and sending a report that includes the differences and the sizes of the objects at the start date and the current time.

In a sixth aspect of the present invention, the steps of determining the first and second sizes, determining the difference do not include manually logging onto a system in the System i platform to determine the first and second sizes.

In a second embodiment, the present invention provides a computer system including a central processing unit (CPU); a memory coupled to the CPU; and a computer-readable storage device coupled to the CPU. The storage device includes instructions that are executed by the CPU via the memory to implement a method of automatically monitoring disk utilization at an object level. The method includes the computer system determining at a first time a first size of an object in a System i® platform by calling an application programming interface (API). The object is (1) an object in an integrated file system (IFS) or (2) a library that includes other objects which are named storage spaces in the System i® platform. The method further includes the computer system determining at a second time a second size of the object by calling the API. The second time is subsequent to the first time and the second size is greater than the first size. The method further includes the computer system determining a difference between the first and second sizes. The method further includes the computer system determining the difference exceeds a threshold difference. The method further includes based on the difference exceeding the threshold difference, the computer system sending an alert about the object having a growth in size that exceeds the threshold difference. The alert indicates the growth at a level of the object, which is different from a growth at a level of an auxiliary storage pool in the System i® platform.

In a third embodiment, the present invention provides a computer program product including a computer-readable storage device and a computer-readable program code stored in the computer-readable storage device. The computer-readable program code includes instructions that are executed by a central processing unit (CPU) of a computer system to implement a method of monitoring disk utilization at an object level. The method includes the computer system determining at a first time a first size of an object in a System i® platform by calling an application programming interface (API). The object is (1) an object in an integrated file system (IFS) or (2) a library that includes other objects which are named storage spaces in the System i® platform. The method further includes the computer system determining at a second time a second size of the object by calling the API. The second time is subsequent to the first time and the second size is greater than the first size. The method further includes the computer system determining a difference between the first and second sizes. The method further includes the computer system determining the difference exceeds a threshold difference. The method further includes based on the difference exceeding the threshold difference, the computer system sending an alert about the object having a growth in size that exceeds the threshold difference. The alert indicates the growth at a level of the object, which is different from a growth at a level of an auxiliary storage pool in the System i® platform.

In a fourth embodiment, the present invention provides a method of monitoring disk utilization at an object level. The method includes the computer presenting a first option to select a comparison of sizes of objects in an integrated file system (IFS) in the System i® platform at first and second times and a second option to select a comparison of sizes of libraries in the System i platform at the first and second times. The method further includes the computer receiving a selection from a user of the first option or the second option. The method further includes the computer receiving the first time as a user entry of a start date. The method further includes the computer either (1) receiving the second time as a user entry of an end date or (2) determining the second time as a current time in response to the user selecting a third option to indicate the comparison of sizes of objects in the IFS or the comparison of sizes of libraries is a real time comparison. The method further includes if the selection of the first option was received and the user entry of the end date was received: (1) the computer retrieving from a data repository the sizes of the objects at the start and end dates, where the sizes of the objects at the start and end dates had been previously stored by periodic monitoring of the sizes of the objects; (2) the computer determining differences between the sizes of the objects at the start date and respective sizes of the objects at the end date; and (3) the computer generating and sending a report that includes the differences and the sizes of the objects at the start and end dates. The method further includes if the selection of the second option was received and the user entry of the end date was received: (1) the computer retrieving from a data repository the sizes of the libraries at the start and end dates, where the sizes of the libraries at the start and end dates had been previously stored by periodic monitoring of the sizes of the libraries; (2) the computer determining differences between the sizes of the libraries at the start date and respective sizes of the libraries at the end date; and (3) the computer generating and sending a report that includes the differences and the sizes of the objects at the start and end dates. The method further includes if the selection of the first option was received and the second time was determined to be the current time: the computer calling the first API, which obtains the sizes of the objects at the start date and the current time; the computer determining differences between the sizes of the objects at the start date and respective sizes of the objects at the current time; and the computer generating and sending a report that includes the differences and the sizes of the objects at the start date and the current time. The method further includes if the selection of the second option was received and the second time was determined to be the current time: the computer calling the second API, which obtains the sizes of the libraries at the start date and the current time; the computer determining differences between the sizes of the libraries at the start date and respective sizes of the libraries at the current time; and the computer generating and sending a report that includes the differences and the sizes of the objects at the start date and the current time.

In a fifth embodiment, the present invention provides a method of monitoring disk utilization at an object level. The method includes a computer determining at a first time a first size of an object by calling an application programming interface (API) provided by a computing platform. The object is (1) a directory in a hierarchical file system provided by the computing platform, or (2) a library that includes other objects which are named storage spaces in the computing platform. The method further includes the computer determining at a second time a second size of the object by calling the API. The second time is subsequent to the first time and the second size is greater than the first size. The method further includes the computer determining a difference between the first and second sizes. The method further includes the computer determining the difference exceeds a threshold difference. The method further includes based on the difference exceeding the threshold difference, the computer sending an alert about the object having a growth in size that exceeds the threshold difference. The alert indicates the growth at a level of the object.

Embodiments and aspects of the present invention summarized above provide a quick and automated approach for monitoring object size information and reporting the information within one hour or less. An automated email facility allows an alert and/or a report to be automatically emailed if object size growth over a specified time period exceeds a predefined threshold value for relative change or relative percentage change over the specified time period.

BRIEF DESCRIPTION OF THE DRAWINGS

FIG. 4 is an example of a display including a start date-to-end date comparison of sizes of libraries resulting from the process of FIGS. 3A-3B, in accordance with embodiments of the present invention.

FIG. 5 is an example of a display including a real time comparison of sizes of libraries resulting from the process of FIGS. 3A-3B, in accordance with embodiments of the present invention.

FIG. 6 is an example of a display including a start date-to-end date comparison of sizes of directories resulting from the process of FIGS. 3A-3B, in accordance with embodiments of the present invention.

FIG. 7 is an example of a display including a real time comparison of sizes of directories resulting from the process of FIGS. 3A-3B, in accordance with embodiments of the present invention.

DETAILED DESCRIPTION

Overview

Embodiments of the present invention utilize system APIs and system programs to automatically track the growth of individual objects defined in a System i® platform, quickly determine whether any of the objects have experienced a sudden and excessive growth in size, and automatically send alerts about objects that have experienced sudden and excessive growth in size. Embodiments of the present invention determine growth in the size of individual libraries and/or individual IFS objects (e.g., directories) in a system in one hour or less, rather than the four to 17 hours taken to determine growth of ASPs in the same system using known techniques. By quickly identifying one or more particular objects and the associated jobs that are responsible for excessive growth in size, embodiments allow a review of the type of data involved in the excessive growth and a determination whether the type of data indicates the data can be deleted. For example, review of a report may determine that an object exhibiting excessive and sudden growth is a temporary object created during patch management, which may be safely deleted. If the type of data indicates application data is causing the excessive growth in size, then the reports or alerts generated by embodiments of the present invention allow owners of the application data to be queried about whether the application data may be safely deleted. By addressing the excessive growth through deletion of data, embodiments of the present invention prevent situations in which growth in size of ASPs beyond critical limits cause a computer system to behave unpredictably or to shut down and require a costly and time-consuming restart during which business is negatively impacted. Embodiments discussed herein do not utilize the RTVDIRINF, PRTDIRINF, RTVDSKINF, or PRTDSKINF commands used by known techniques for disk utilization analysis.

As used herein, a library is defined as a system object that serves as a directory to other objects. A library groups related objects, and allows a user to find objects by name. In the System i® platform, the system-recognized identifier for the object type of a library is *LIB. An object is defined as is a named storage space that consists of a set of characteristics that describe itself and, in some cases, data. An object is anything that exists in and occupies space in storage and on which operations can be performed. Some examples of objects in a library are programs, files, and folders.

As used herein, an IFS object is an object that is organized in the hierarchical directory structure provided by IFS. A directory is a special IFS object that is used to locate objects by names. Each directory contains a list of objects that are attached to it. The list of objects may include one or more other directories.

System for Monitoring Disk Utilization at an Object Level

Figure 1:
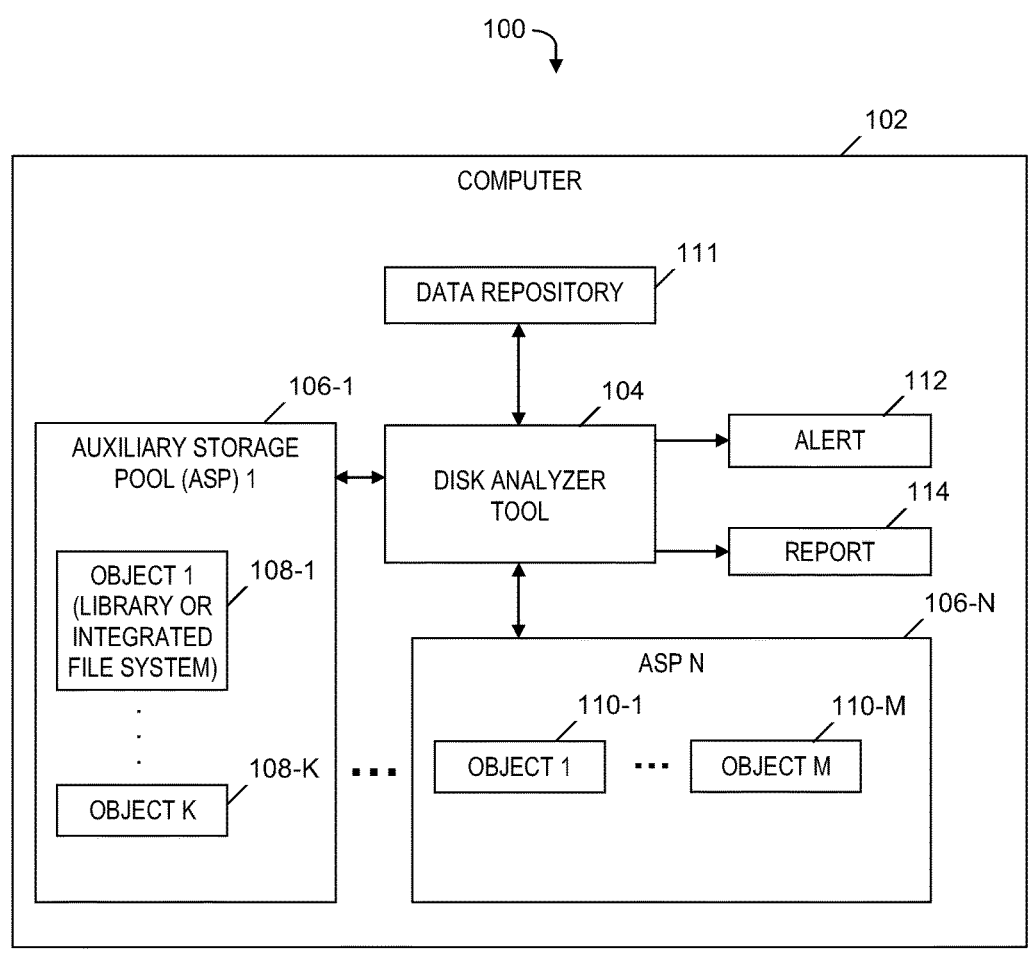
FIG. 1 is a block diagram of a system for monitoring disk utilization at an object level, in accordance with embodiments of the present invention.

FIG. 1 is a block diagram of a system 100 for monitoring disk utilization at an object level, in accordance with embodiments of the present invention. System 100 includes a computer 102, which executes a software-based disk analyzer tool 104. In one embodiment, computer 102 is a System i® computer running the IBM® operating system. Disk analyzer tool 104 accesses ASPs 106-1, . . . , 106-N, where N is an integer greater than or equal to one, and utilizes system programs and APIs to determine the sizes of objects included in the ASPs. The objects included in the ASPs are libraries and/or IFS objects, such as directories. ASP 106-1 includes object 108-1, . . . , object 108-K, where K is an integer greater than or equal to one. ASP 106-N includes object 110-1, . . . , object 110-M, where M is an integer greater than or equal to one.

Disk analyzer tool 104 determines and monitors the sizes of the aforementioned objects (i.e., libraries or IFS objects) at successive times which are separated by predetermined time intervals. Disk analyzer tool 104 stores in data repository 111 the sizes of the aforementioned objects and the respective times at which the sizes were determined. Disk analyzer tool 104 determines the difference between the sizes of each object at the successive times, determines whether the difference exceeds a predetermined threshold difference, and sends an alert 112 if the difference between sizes of the object at the successive times exceeds the threshold difference. As used herein, a difference between sizes is a relative difference between the sizes or a relative percentage difference between the sizes. The threshold difference may be a threshold relative difference or a threshold relative percentage difference such as 5%.

In response to a user command for a disk utilization report and entry of a start date and an end date, disk analyzer tool 104 determines the sizes of objects at the start date and the end date, and for each object, determines the difference between the sizes at the start and end dates. Disk analyzer tool 104 generates and presents a report 114, which includes the name of each object, the size at the start date, the size at the end date, and the difference between the sizes at the start and end dates.

In response to a user command for a real time disk utilization report, and an entry of a start date, disk analyzer tool 104 determines the sizes of objects at the start date and at the current time, and for each object, determines the difference between the sizes at the start date and the current time. Disk analyzer tool 104 generates and presents report 114 which includes the name of each object, the size at the start date, the size at the current time, and the difference between the sizes at the start date and the current time.

The functionality of the components of FIG. 1 is described in more detail in the discussions presented below relative to FIG. 2, FIGS. 3A-3B, and FIG. 8.

Process for Monitoring Disk Utilization at an Object Level

Figure 2:
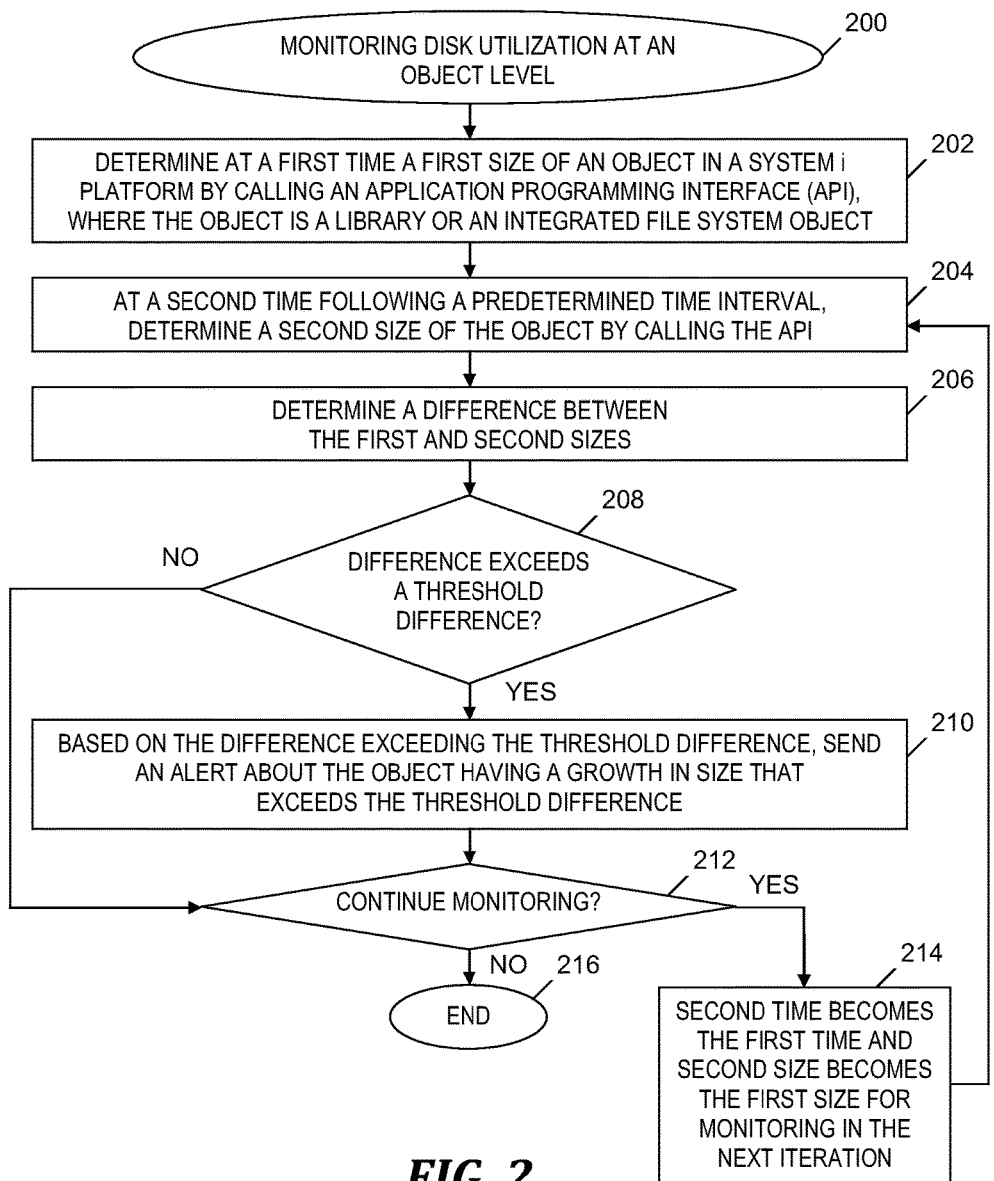
FIG. 2 is a flowchart of a process of monitoring disk utilization at an object level, where the process is implemented in the system of FIG. 1, in accordance with embodiments of the present invention.

FIG. 2 is a flowchart of a process of monitoring disk utilization at an object level, where the process is implemented in the system of FIG. 1, in accordance with embodiments of the present invention. The process of FIG. 2 begins at step 200. Prior to step 202, disk analyzer tool 104 (see FIG. 1) receives a threshold difference. In one embodiment, prior to step 202, disk analyzer tool 104 (see FIG. 1) receives a time interval, which is the frequency at which disk analyzer tool 104 monitors the sizes of objects (i.e., libraries and/or IFS objects) in ASP 106-1, . . . , 106-N (see FIG. 1). For example, if the received time interval is one day, then disk analyzer tool 104 (see FIG. 1) determines the sizes of the objects once each day.

In step 202, disk analyzer tool 104 (see FIG. 1) determines at a first time a first size of an object in a System i® platform (i.e., an object included in object 108-1, . . . , object 108-K (see FIG. 1) . . . object 110-1, . . . , object 110-M (see FIG. 1)). The object is a library or an IFS object. To determine the first size of the object, disk analyzer tool 104 (see FIG. 1) calls system programs and one or more APIs. In one embodiment, disk analyzer tool 104 (see FIG. 1) calls the following APIs: QLIRLIBD to determine the size of a single library and QSRSRV to determine sizes of directories and sub-directories. In step 202, disk analyzer tool 104 (see FIG. 1) also stores the first size of the object and the first time in a database record or another data structure in data repository 111 (see FIG. 1).

In step 204, disk analyzer tool 104 (see FIG. 1) determines at a second time a second size of the object by again calling the system programs and API(s). The second time is subsequent to the first time. In one embodiment, the amount of time between the first and second times is equal to the time interval received by disk analyzer tool 104 (see FIG. 1) prior to step 202. In step 204, disk analyzer tool 104 (see FIG. 1) also stores the second size of the object and the second time in a database record or another data structure in data repository 111 (see FIG. 1).

In step 206, disk analyzer tool 104 (see FIG. 1) determines a difference between the first and second sizes. In the first iteration of the process of FIG. 2, the first and second sizes are determined in the most recent performances of steps 202 and 204, respectively. In subsequent iterations, the second size is determined in the most recent performance of step 204 and the first size is determined in step 214, which is described below.

In step 208, disk analyzer tool 104 (see FIG. 1) determines whether the difference determined in step 206 exceeds the threshold difference. If disk analyzer tool 104 (see FIG. 1) determines in step 208 that the difference exceeds the threshold difference, then the Yes branch of step 208 is taken and step 210 is performed.

In step 210, based on the difference exceeding the threshold difference, disk analyzer tool 104 (see FIG. 1) sends alert 112 (see FIG. 1) (e.g., by e-mail) about the object having a growth in size between the first and second times that exceeds the threshold difference (i.e., the object has experienced a sudden and excessive growth in size).

In step 212, disk analyzer tool 104 (see FIG. 1) determines whether monitoring of object sizes is to be continued. If disk analyzer tool 104 (see FIG. 1) determines in step 212 that monitoring is to be continued, then the Yes branch of step 212 is followed and step 214 is performed.

In step 214, disk analyzer tool 104 (see FIG. 1) prepares for the next iteration of the process of FIG. 2 by setting the value of the first time in the next iteration to be the second time in the current iteration and setting the value of the first size in the next iteration to become the second size in the current iteration. Following step 214, the next iteration of the process of FIG. 2 starts at step 204, with the determination of the second size at the second time.

Returning to step 212, if disk analyzer tool 104 (see FIG. 1) determines that monitoring is not to be continued, then the No branch of step 212 is followed, and the process of FIG. 2 ends at step 216.

Returning to step 208, if disk analyzer tool 104 (see FIG. 1) determines that the difference does not exceed the threshold difference, then the No branch of step 208 is taken and the process of FIG. 2 continues with step 212, as described above.

In one embodiment, the sizes of multiple objects in system 100 (see FIG. 1) are monitored by using the steps of the process of FIG. 2 for each of the multiple objects.

In an alternate embodiment, in an alternate to step 202, disk analyzer tool 104 (see FIG. 1) determines at a first time a first size of an object by calling an API provided by a non-System i® computing platform which is a Unix®, IBM® AIX®, or Microsoft® Windows® platform, or a mainframe platform such as System/390®. The object is (1) a directory in a hierarchical file system provided by the computing platform, or (2) a library that includes other objects which are named storage spaces in the computing platform. Disk analyzer tool 104 (see FIG. 1) stores the first size in data repository 111 (see FIG. 1). In an alternate to step 204, disk analyzer tool 104 (see FIG. 1) determines at a second time a second size of the object by calling the API. The second time is subsequent to the first time and the second size is greater than the first size. Disk analyzer tool 104 (see FIG. 1) stores the second size in data repository 111 (see FIG. 1). The descriptions of steps 206, 208, 210, 212, 214 and 216 presented above also apply to the alternate embodiment discussed in this paragraph.

Figure 3A:
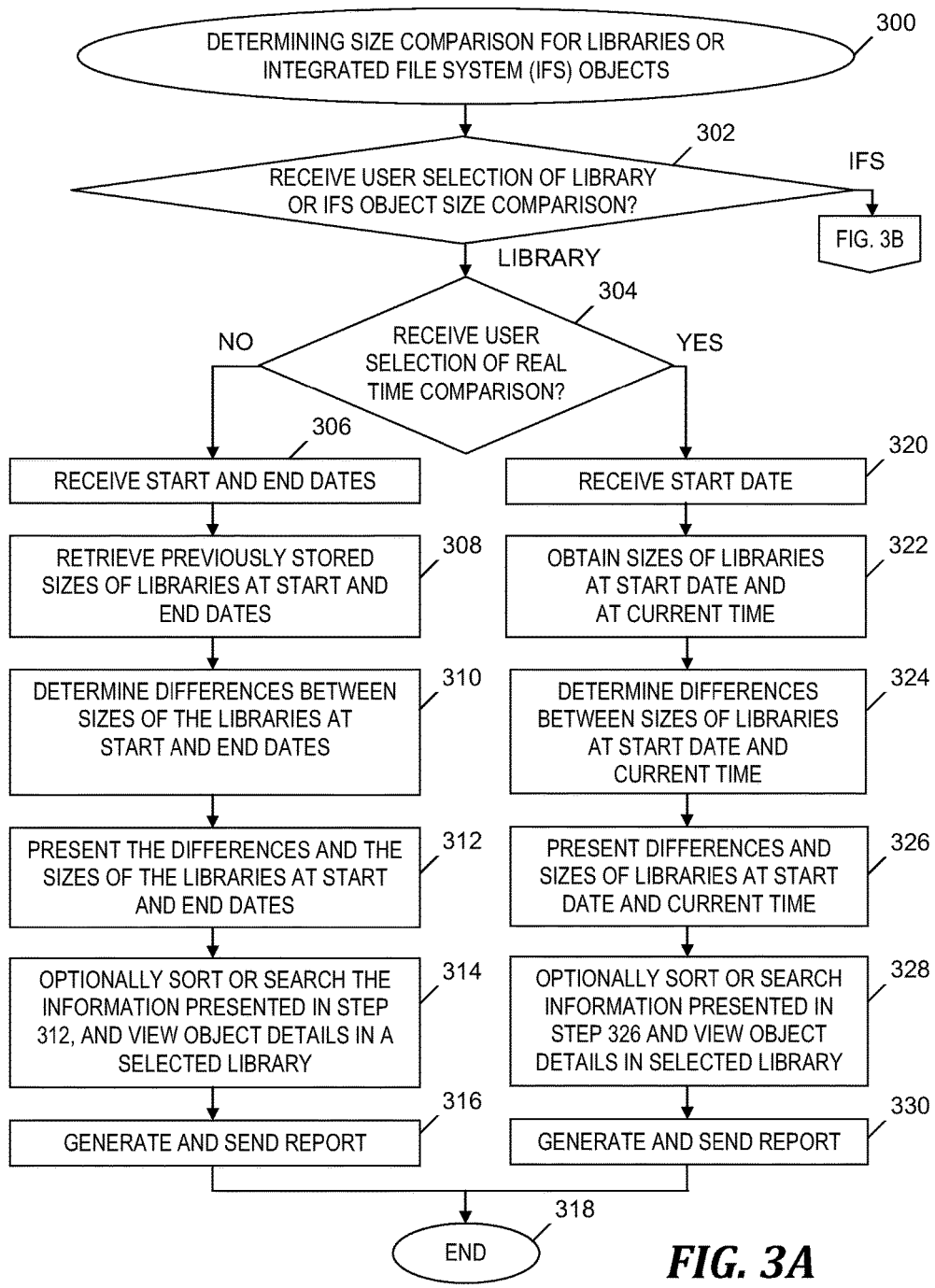
FIGS. 3A-3B depict a flowchart of a process for determining a size comparison for libraries or integrated file system objects, where the process is implemented in the system of FIG. 1, in accordance with embodiments of the present invention.
Figure 3B:
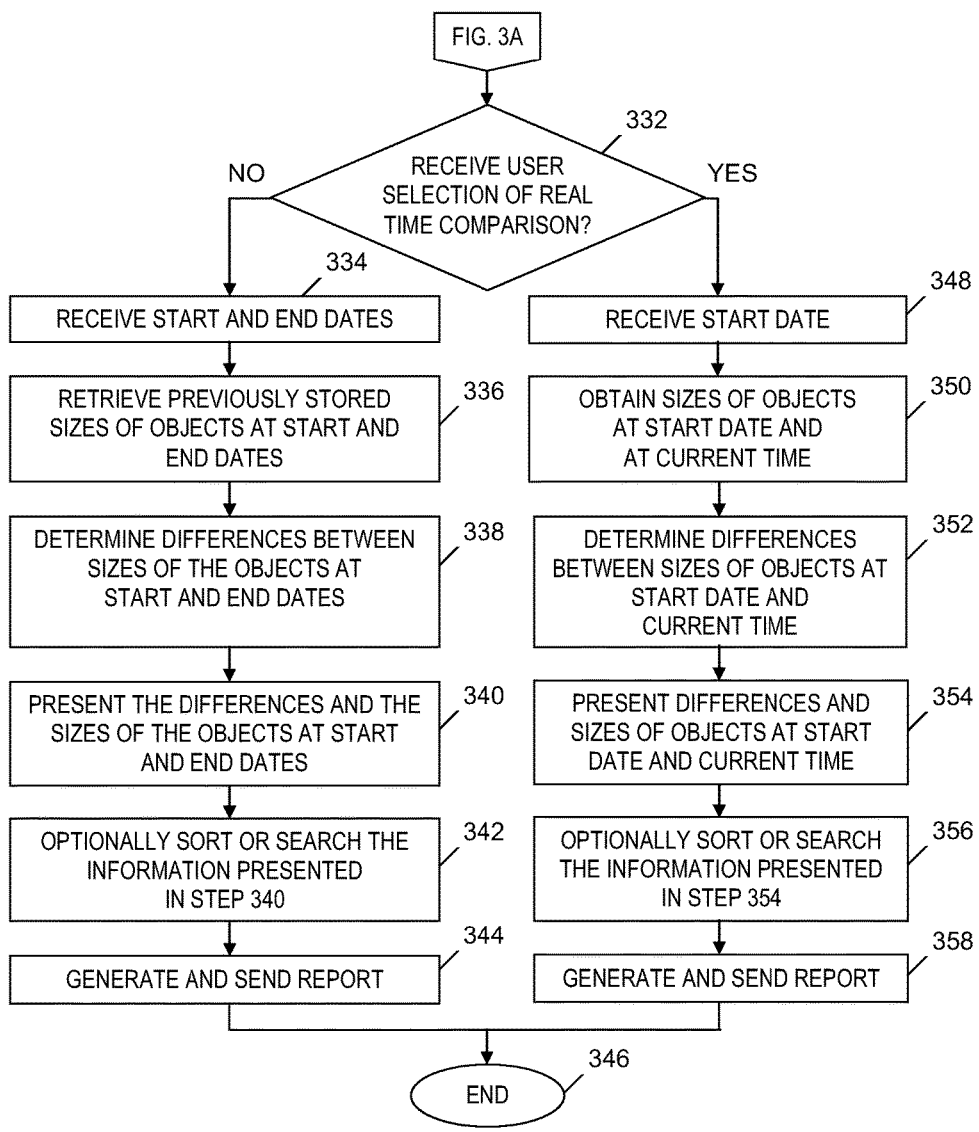

FIGS. 3A-3B depict a flowchart of a process for determining a size comparison for libraries or integrated file system objects, where the process is implemented in the system of FIG. 1, in accordance with embodiments of the present invention. The process of FIGS. 3A-3B starts at step 300. In step 302, disk analyzer tool 104 (see FIG. 1) receives a selection from a user to perform either (1) a comparison of sizes of libraries or (2) a comparison of sizes of IFS objects. If disk analyzer tool 104 (see FIG. 1) receives a selection to perform the comparison of sizes of libraries, the LIBRARY branch of step 302 is taken and step 304 is performed.

In step 304, disk analyzer tool 104 (see FIG. 1) determines whether a selection by the user was received for a real time comparison of sizes of libraries, rather than a comparison of sizes of the libraries at a start date and an end date that precede the current time. If disk analyzer tool 104 (see FIG. 1) determines in step 304 that the user did not select a real time comparison of sizes, then the No branch of step 304 is taken and step 306 is performed.

In step 306, disk analyzer tool 104 (see FIG. 1) receives the start and end dates from user entries on an interface provided by disk analyzer tool 104 (see FIG. 1).

In step 308, disk analyzer tool 104 (see FIG. 1) retrieves from data repository 111 (see FIG. 1) the sizes of the libraries at the start and end dates, where the start and end dates were received in step 306. In one embodiment, the API called in step 308 is QLIRLIBD in the System i® platform.

In step 310, disk analyzer tool 104 (see FIG. 1) determines the actual and relative differences between the sizes of the libraries at the start and end dates. In one embodiment, the relative difference between the sizes of a library at the start and end dates is a relative percentage difference equal to (actual difference between the sizes/size of the library at the start date)×100%.

In step 312, disk analyzer tool 104 (see FIG. 1) displays or otherwise presents the differences and sizes of the libraries at the start and end dates.

In step 314, optional user selections and entries on the interface causes disk analyzer tool 104 (see FIG. 1) to sort the information presented in step 312 (e.g., by the sizes of the libraries at the end date, the name of the library, or the differences in the sizes) and/or to search the information presented in step 312 by the name or partial name of the library. Another optional user selection causes disk analyzer tool 104 (see FIG. 1) to present details of objects that are included within a user-selected library. The details of objects may include their names, sizes, types, creation dates, identifiers of the creators, and dates of the changes made.

In step 316, an optional user selection on the interface causes disk analyzer tool 104 (see FIG. 1) to generate report 114 (see FIG. 1) as a spool file report and to send report 114 (see FIG. 1) to one or more predetermined email addresses. The report includes names of the libraries, sizes of the libraries at the start and end dates, and differences between the sizes.

In step 318, which follows step 316, the process of FIGS. 3A-3B ends.

Returning to step 304, if disk analyzer tool 104 (see FIG. 1) determines that the user selected a real time comparison of sizes of libraries, then the Yes branch of step 304 is taken and step 320 is performed.

In step 320, disk analyzer tool 104 (see FIG. 1) receives the start date from a user entry on the interface.

In step 322, disk analyzer tool 104 (see FIG. 1) obtains sizes of the libraries at the start date received in step 320 and at the current time. Disk analyzer tool 104 (see FIG. 1) in step 322 obtains the sizes of the libraries at the current time by one or more calls to an API. In one embodiment, the API called in step 322 is QLIRLIBD in the System i® platform. Disk analyzer tool 104 (see FIG. 1) in step 322 obtains the sizes of the libraries at the start date by retrieving the sizes from data repository 111 (see FIG. 1).

In step 324, disk analyzer tool 104 (see FIG. 1) determines the actual and relative differences between the sizes of the libraries at the start date and at the current time. In one embodiment, the relative difference between the sizes of a library at the start date and the current time is a relative percentage difference equal to (actual difference between the sizes/size of the library at the start date)×100%.

In step 326, disk analyzer tool 104 (see FIG. 1) displays or otherwise presents the differences determined in step 324 and the sizes of the libraries at the start date and at the current time.

In step 328, optional user selections and entries on the interface causes disk analyzer tool 104 (see FIG. 1) to sort the information presented in step 326 (e.g., by the sizes of the libraries at the current time, the name of the library, or the differences in the sizes) and/or to search the information presented in step 326 by the name or partial name of the library. Another optional user selection causes disk analyzer tool 104 (see FIG. 1) to present details of objects that are included within a user-selected library. The details of objects may include their names, sizes, types, creation dates, identifiers of the creators, and dates of changes made.

In step 330, an optional user selection on the interface causes disk analyzer tool 104 (see FIG. 1) to generate report 114 (see FIG. 1) as a spool file report and to send report 114 (see FIG. 1) to one or more predetermined email addresses. The report includes names of the libraries, sizes of the libraries at the start date and the current time, and differences between the sizes. Following step 330, the process of FIGS. 3A-3B ends at step 318.

Returning to step 302, if disk analyzer tool 104 (see FIG. 1) receives a selection to perform the comparison of sizes of IFS objects, the IFS branch of step 302 is taken and step 332 in FIG. 3B is performed.

In step 332, disk analyzer tool 104 (see FIG. 1) determines whether a selection by the user was received for a real time comparison of sizes of IFS objects, rather than a comparison of sizes of the IFS objects at a start date and an end date that precede the current time. If disk analyzer tool 104 (see FIG. 1) determines in step 332 that the user did not select a real time comparison of sizes, then the No branch of step 332 is taken and step 334 is performed.

In step 334, disk analyzer tool 104 (see FIG. 1) receives the start and end dates from user entries on an interface provided by disk analyzer tool 104 (see FIG. 1).

In step 336, disk analyzer tool 104 (see FIG. 1) retrieves from data repository 111 (see FIG. 1) the sizes of the IFS objects at the start and end dates, where the start and end dates were received in step 334. In one embodiment, the API called in step 336 is QSRSRV in the System i® platform.

In step 338, disk analyzer tool 104 (see FIG. 1) determines the actual and relative differences between the sizes of the IFS objects at the start and end dates. In one embodiment, the relative difference between the sizes of an IFS object at the start and end dates is a relative percentage difference equal to (actual difference between the sizes/size of the IFS object at the start date)×100%.

In step 340, disk analyzer tool 104 (see FIG. 1) displays or otherwise presents the differences and sizes of the IFS objects at the start and end dates.

In step 342, optional user selections and entries on the interface causes disk analyzer tool 104 (see FIG. 1) to sort the information presented in step 340 (e.g., by the sizes of the IFS objects at the end date, the name of the IFS object, or the differences in the sizes) and/or to search the information presented in step 340 by a name or partial name of an IFS object.

In step 344, an optional user selection on the interface causes disk analyzer tool 104 (see FIG. 1) to generate report 114 (see FIG. 1) as a spool file report and to send report 114 (see FIG. 1) to one or more predetermined email addresses. The report includes names of the IFS objects, sizes of the IFS objects at the start and end dates, and differences between the sizes.

The process of FIGS. 3A-3B ends at step 346, which follows step 344.

Returning to step 332, if disk analyzer tool 104 (see FIG. 1) received a user selection of a real time comparison of sizes of IFS objects, then the Yes branch of step 332 is taken and step 348 is performed.

In step 348, disk analyzer tool 104 (see FIG. 1) receives the start date from a user entry on an interface provided by disk analyzer tool 104 (see FIG. 1).

In step 350, disk analyzer tool 104 (see FIG. 1) obtains sizes of the IFS objects at the start date received in step 352 and at the current time. Disk analyzer tool 104 (see FIG. 1) in step 350 obtains the sizes of the IFS objects at the current time by one or more calls to an API. In one embodiment, the API called in step 350 is QSRSRV in the System i® platform. Disk analyzer tool 104 (see FIG. 1) in step 350 obtains the sizes of the IFS objects at the start date by retrieving the sizes from data repository 111 (see FIG. 1).

In step 352, disk analyzer tool 104 (see FIG. 1) determines the actual and relative differences between the sizes of the IFS objects at the start date and the current time. In one embodiment, the relative difference between the sizes of an IFS object at the start date and the current time is a relative percentage difference equal to (actual difference between the sizes/size of the IFS object at the start date)×100%.

In step 354, disk analyzer tool 104 (see FIG. 1) displays or otherwise presents the differences and sizes of the IFS objects at the start and end dates.

In step 356, optional user selections and entries on the interface causes disk analyzer tool 104 (see FIG. 1) to sort the information presented in step 354 (e.g., by the sizes of the IFS objects at the current time, the name of the IFS object, or the differences in the sizes) and/or to search the information presented in step 354 by a name or partial name of an IFS object.

In step 358, an optional user selection on the interface causes disk analyzer tool 104 (see FIG. 1) to generate report 114 (see FIG. 1) as a spool file report and to send report 114 (see FIG. 1) to one or more predetermined email addresses. The report includes names of the IFS objects, sizes of the IFS objects at the start date and the current time, and differences between the sizes.

The process of FIGS. 3A-3B ends at step 346, which follows step 358.

EXAMPLES

FIG. 4 is an example of a display 400 including a start date-to-end date comparison of sizes of libraries resulting from the process of FIGS. 3A-3B, in accordance with embodiments of the present invention. Display 400 is a report that includes a start date of Oct. 6, 2014, an end date of Oct. 7, 2014, library names, sizes of the libraries at the start and end dates, absolute differences between the sizes of the libraries at the start and end dates (i.e., the values under the column labeled "Difference"), and relative percentage differences between the sizes at the start and end dates (i.e., the values under the column labeled "% Difference"). For example, for the library named QASDLIB1, display 400 includes a size of 49,975 MB at the start date, a size of 56,422 MB at the end date, an absolute difference of 6,447 MB (i.e., the size at the end date−the size at the start date, or 56,422 MB−49,975 MB), and a relative percentage difference of 12.90% (i.e., (the absolute difference divided by the size of the library at the start date)×100%, or (6,447 MB/49,975 MB)×100%). Display 400 is an example of the report generated in step 316 (see FIG. 3A).

FIG. 5 is an example of a display 500 including a real time comparison of sizes of libraries resulting from the process of FIGS. 3A-3B, in accordance with embodiments of the present invention. Display 500 is a report that includes a start date of Oct. 6, 2014 and a current time of 19:05:22 on Oct. 8, 2014. Display 500 further includes library names, sizes of the libraries at the start date and current time (i.e., the values under the columns labeled "Start Date" and "End Date", respectively), absolute differences between the sizes of the libraries at the start date and the current time (i.e., the values under the column labeled "Difference"), and relative percentage differences between the sizes at the start date and current time (i.e., the values under the column labeled "% Difference"). For example, for the library named QUSRSYS, display 500 includes a size of 210,284 MB at the start date, a size of 616,570 MB at the current time, an absolute difference of 406,286 MB (i.e., the size at the current time−the size at the start date, or 616,570 MB−210,284 MB), and a relative percentage difference of 193.20% (i.e., (the absolute difference divided by the size of the library at the start date)×100%, or (406,286 MB/210,284 MB)× 100%). Display 500 is an example of the report generated in step 330 (see FIG. 3A).

FIG. 6 is an example of a display 600 including a start date-to-end date comparison of sizes of directories resulting from the process of FIGS. 3A-3B, in accordance with embodiments of the present invention. Display 600 is a report that includes a start date of Oct. 6, 2014, an end date of Oct. 7, 2014, directory names, sizes of the directories at the start and end dates, absolute differences between the sizes of the directories at the start and end dates (i.e., the values under the column labeled "Difference"), and relative percentage differences between the sizes of the directories at the start and end dates (i.e., the values under the column labeled "% Difference"). For example, for the directory named ERRORS, display 600 includes a size of 49 MB at the start date, a size of 50 MB at the end date, an absolute difference of 1 MB (i.e., the size at the end date–the size at the start date, or 50 MB–49 MB), and a relative percentage difference of 2.04% (i.e., (the absolute difference divided by the size of the directory at the start date)×100%, or (1 MB/49 MB)×100%). Display 600 is an example of the report generated in step 344 (see FIG. 3B).

FIG. 7 is an example of a display 700 including a real time comparison of sizes of directories resulting from the process of FIGS. 3A-3B, in accordance with embodiments of the present invention. Display 700 is a report that includes a start date of Oct. 6, 2014 and a current time of 19:22:27 on Oct. 8, 2014. Display 700 further includes directory names, sizes of the directories at the start date and current time (i.e., the values under the columns labeled "Start Date" and "End Date", respectively), absolute differences between the sizes of the directories at the start date and current time (i.e., the values under the column labeled "Difference"), and relative percentage differences between the sizes at the start date and current time (i.e., the values under the column labeled "% Difference"). For example, for the directory named ERRORS, display 700 includes a size of 49 MB at the start date, a size of 53 MB at the current time, an absolute difference of 4 MB (i.e., the size at the current time–the size at the start date, or 53 MB–49 MB), and a relative percentage difference of 8.16% (i.e., (the absolute difference divided by the size of the directory at the start date)×100%, or (4 MB/49 MB)×100%). Display 700 is an example of the report generated in step 358 (see FIG. 3B).

Computer System

Figure 8:
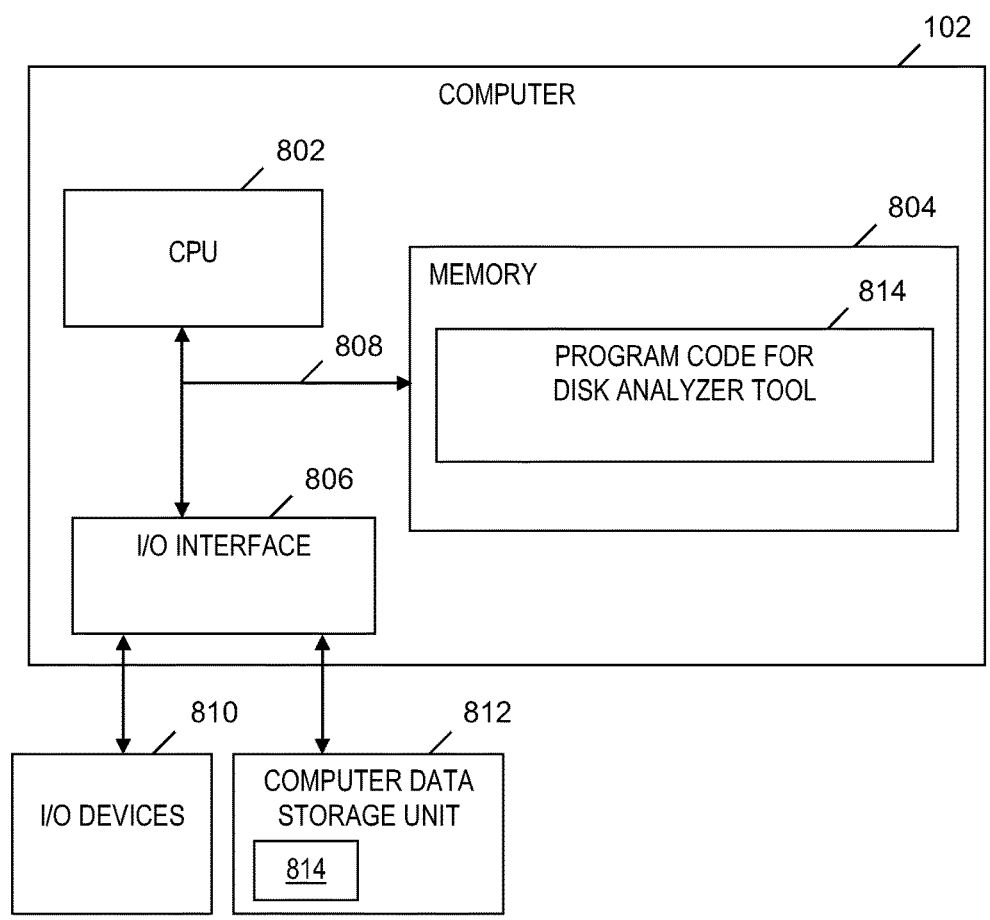
FIG. 8 is a block diagram of a computer that is included in the system of FIG. 1 and that implements the processes of FIG. 2 and FIGS. 3A-3B, in accordance with embodiments of the present invention.

FIG. 8 is a block diagram of a computer that is included in the system of FIG. 1 and that implements the processes of FIG. 2 and FIGS. 3A-3B, in accordance with embodiments of the present invention. Computer 102 is a computer system that generally includes a central processing unit (CPU) 802, a memory 804, an input/output (I/O) interface 806, and a bus 808. Further, computer 102 is coupled to I/O devices 810 and a computer data storage unit 812. CPU 802 performs computation and control functions of computer 102, including carrying out instructions included in program code 814 to perform a method of monitoring disk utilization at an object level, where the instructions are carried out by CPU 802 via memory 804. CPU 802 may include a single processing unit, or be distributed across one or more processing units in one or more locations (e.g., on a client and server). Program code 814 includes program code for the software-based components of computer 102, such as disk analyzer tool 104 (see FIG. 1).

Memory 804 includes a known computer readable storage medium, which is described below. In one embodiment, cache memory elements of memory 804 provide temporary storage of at least some program code (e.g., program code 814) in order to reduce the number of times code must be retrieved from bulk storage while instructions of the program code are carried out. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display device, keyboard, etc. Bus 808 provides a communication link between each of the components in computer 102, and may include any type of transmission link, including electrical, optical, wireless, etc.

I/O interface 806 also allows computer 102 to store information (e.g., data or program instructions such as program code 814) on and retrieve the information from computer data storage unit 812 or another computer data storage unit (not shown). Computer data storage unit 812 includes a known computer-readable storage medium, which is described below. In one embodiment, computer data storage unit 812 is a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814 that includes instructions that are carried out by CPU 802 via memory 804 to monitor disk utilization at an object level. Although FIG. 8 depicts memory 804 as including program code 814, the present invention contemplates embodiments in which memory 804 does not include all of code 814 simultaneously, but instead at one time includes only a portion of code 814.

Further, memory 804 includes an operating system (not shown) and may include other systems not shown in FIG. 8. In one embodiment, the operating system is the IBM® i operating system.

Storage unit 812 and/or one or more other computer data storage units (not shown) that are coupled to computer 102 may include ASP 106-1, . . . , ASP 106-N (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to monitoring disk utilization at an object level. Thus, an embodiment of the present invention discloses a process for supporting computer infrastructure, where the process includes providing at least one support service for at least one of integrating, hosting, maintaining and deploying computer-readable code (e.g., program code 814) in a computer system (e.g., computer 102) including one or more processors (e.g., CPU 802), wherein the processor(s) carry out instructions contained in the code causing the computer system to monitor disk utilization at an object level. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of monitoring disk utilization at an object level.

While it is understood that program code 814 for monitoring disk utilization at an object level may be deployed by manually loading directly in client, server and proxy computers (not shown) via loading a computer-readable storage medium (e.g., computer data storage unit 812), program code 814 may also be automatically or semi-automatically deployed into computer 102 by sending program code 814 to a central server or a group of central servers. Program code 814 is then downloaded into client computers (e.g., computer 102) that will execute program code 814. Alternatively, program code 814 is sent directly to the client computer via e-mail. Program code 814 is then either detached to a directory on the client computer or loaded into a directory on the client computer by a button on the e-mail that executes a program that detaches program code 814 into a directory. Another alternative is to send program code 814 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 814 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of monitoring disk utilization at an object level. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 804 and computer data storage unit 812) having computer readable program instructions 814 thereon for causing a processor (e.g., CPU 802) to carry out aspects of the present invention.

The computer readable storage medium (i.e., computer readable storage device) can be a tangible device that can retain and store instructions (e.g., program code 814) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium and a computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 814) described herein can be downloaded to respective computing/processing devices (e.g., computer 102) from a computer readable storage medium or to an external computer or external storage device (e.g., computer data storage unit 812) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 814) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIGS. 3A-3B) and/or block diagrams (e.g., FIG. 1 and FIG. 8) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 814).

These computer readable program instructions may be provided to a processor (e.g., CPU 802) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 812) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 814) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In one embodiment, memory 804 is ROM and computer 102 is a special purpose computer, where the ROM includes instructions of program code 814 that are executed by CPU 802 via ROM 804 to monitor disk utilization at an object level.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of monitoring disk utilization at an object level, the method comprising the steps of:
    a computer determining at a first time a first size of an object in a System i platform by calling an application programming interface (API), the object being (1) an object in an integrated file system (IFS), or (2) a library that includes other objects which are named storage spaces in the System i platform;
    the computer determining at a second time a second size of the object by calling the API, the second time being subsequent to the first time and the second size being greater than the first size;
    the computer determining a difference between the first and second sizes;
    the computer determining the difference exceeds a threshold difference;
    based on the difference exceeding the threshold difference, the computer sending an alert about the object having a growth in size that exceeds the threshold difference, the alert indicating the growth at a level of the object, which is different from a growth at a level of an auxiliary storage pool in the System i platform;
    the computer receiving via an interface a selection by a user of a real time comparison of sizes of objects in the IFS in the System i platform at a start date and a current time;
    the computer receiving via the interface the start date entered by the user;
    the computer calling the API, which obtains the sizes of the objects in the IFS at the start date and the current time;
    the computer determining differences between the sizes of the objects in the IFS at the start date and respective sizes of the objects in the IFS at the current time;
    the computer presenting the differences and the sizes of the objects in the IFS at the start date and the current time; and
    the computer generating and sending a report that includes the differences and the sizes of the objects in the IFS at the start date and the current time.

2. The method of claim 1, wherein the step of determining the first size of the object includes determining the first size without employing commands RTVDSKINF, PRTDSKINF, RTVDIRINF, or PRTDIRINF, and wherein the step of determining the second size of the object includes determining the second size without employing commands RTVDSKINF, PRTDSKINF, RTVDIRINF, or PRTDIRINF.

3. The method of claim 1, further comprising the steps of:
    the computer receiving via an interface a selection from a user of a real time comparison of sizes of libraries at a start date and a current time;
    the computer receiving via the interface the start date entered by the user;
    the computer calling an application programming interface (API) in the System i platform, which obtains the sizes of the libraries at the start date and the current time;
    the computer determining differences between the sizes of the libraries at the start date and respective sizes of the libraries at the current time;
    the computer presenting the differences and the sizes of the libraries at the start date and the current time; and
    the computer generating and sending a report that includes the differences and the sizes of the libraries at the start date and the current time.

4. The method of claim 1, wherein the steps of determining the first and second sizes, and the step of determining the difference between the first and second sizes do not include manually logging onto a system in the System i platform to determine the first and second sizes.

5. The method of claim 1, further comprising the step of:
    providing at least one support service for at least one of creating, integrating, hosting, maintaining, and deploying computer-readable program code in the computer, the program code being executed by a processor in the computer to implement the steps of determining the first size, determining the second size, determining the difference between the first and second sizes, determining the difference exceeds the threshold difference, sending the alert, receiving the selection of the real time comparison of the sizes of the objects in the IFS at the start date and the current time, receiving the start date entered by the user, calling the API which obtains the sizes of the objects in the IFS at the start date and the current time, determining the differences between the sizes of the objects in the IFS at the start date and the respective sizes of the objects in the IFS at the current time, presenting the differences and the sizes of the objects in the IFS at the start date and the current time, and generating and sending the report.

6. A computer system comprising:
a central processing unit (CPU);
a memory coupled to the CPU; and
a computer-readable storage device coupled to the CPU, the storage device containing instructions that are executed by the CPU via the memory to implement a method of automatically monitoring disk utilization at an object level, the method comprising the steps of:
the computer system determining at a first time a first size of an object in a System i platform by calling an application programming interface (API), the object being (1) an object in an integrated file system (IFS), or (2) a library that includes other objects which are named storage spaces in the System i platform;
the computer system determining at a second time a second size of the object by calling the API, the second time being subsequent to the first time and the second size being greater than the first size;
the computer system determining a difference between the first and second sizes;
the computer system determining the difference exceeds a threshold difference;
based on the difference exceeding the threshold difference, the computer system sending an alert about the object having a growth in size that exceeds the threshold difference, the alert indicating the growth at a level of the object, which is different from a growth at a level of an auxiliary storage pool in the System i platform;
the computer system receiving via an interface a selection by a user of a real time comparison of sizes of objects in the IFS in the System i platform at a start date and a current time;
the computer system receiving via the interface the start date entered by the user;
the computer system calling the API, which obtains the sizes of the objects in the IFS at the start date and the current time;
the computer system determining differences between the sizes of the objects in the IFS at the start date and respective sizes of the objects in the IFS at the current time;
the computer system presenting the differences and the sizes of the objects in the IFS at the start date and the current time; and
the computer system generating and sending a report that includes the differences and the sizes of the objects in the IFS at the start date and the current time.

7. The computer system of claim 6, wherein the step of determining the first size of the object includes determining the first size without employing commands RTVDSKINF, PRTDSKINF, RTVDIRINF, or PRTDIRINF, and wherein the step of determining the second size of the object includes determining the second size without employing commands RTVDSKINF, PRTDSKINF, RTVDIRINF, or PRTDIRINF.

8. The computer system of claim 6, wherein the method further comprises the steps of:
the computer system receiving via an interface a selection from a user of a real time comparison of sizes of libraries at a start date and a current time;
the computer system receiving via the interface the start date entered by the user;
the computer system calling an application programming interface (API) in the System i platform, which obtains the sizes of the libraries at the start date and the current time;
the computer system determining differences between the sizes of the libraries at the start date and respective sizes of the libraries at the current time;
the computer system presenting the differences and the sizes of the libraries at the start date and the current time; and
the computer system generating and sending a report that includes the differences and the sizes of the libraries at the start date and the current time.

9. The computer system of claim 6, wherein the steps of determining the first and second sizes, and the step of determining the difference between the first and second sizes do not include manually logging onto a system in the System i platform to determine the first and second sizes.

10. A computer program product, comprising:
a computer-readable storage device; and
a computer-readable program code stored in the computer-readable storage device, the computer-readable program code containing instructions that are executed by a central processing unit (CPU) of a computer system to implement a method of automatically monitoring disk utilization at an object level, the method comprising the steps of:
the computer system determining at a first time a first size of an object in a System i platform by calling an application programming interface (API), the object being (1) an object in an integrated file system (IFS), or (2) a library that includes other objects which are named storage spaces in the System i platform;
the computer system determining at a second time a second size of the object by calling the API, the second time being subsequent to the first time and the second size being greater than the first size;
the computer system determining a difference between the first and second sizes;
the computer system determining the difference exceeds a threshold difference;
based on the difference exceeding the threshold difference, the computer system sending an alert about the object having a growth in size that exceeds the threshold difference, the alert indicating the growth at a level of the object, which is different from a growth at a level of an auxiliary storage pool in the System i platform;
the computer system receiving via an interface a selection by a user of a real time comparison of sizes of objects in the IFS in the System i platform at a start date and a current time;
the computer system receiving via the interface the start date entered by the user;

the computer system calling the API, which obtains the sizes of the objects in the IFS at the start date and the current time;

the computer system determining differences between the sizes of the objects in the IFS at the start date and respective sizes of the objects in the IFS at the current time;

the computer system presenting the differences and the sizes of the objects in the IFS at the start date and the current time; and the computer system generating and sending a report that includes the differences and the sizes of the objects in the IFS at the start date and the current time.

11. The computer program product of claim 10, wherein the step of determining the first size of the object includes determining the first size without employing commands RTVDSKINF, PRTDSKINF, RTVDIRINF, or PRTDIRINF, and wherein the step of determining the second size of the object includes determining the second size without employing commands RTVDSKINF, PRTDSKINF, RTVDIRINF, or PRTDIRINF.

12. The computer program product of claim 10, wherein the method further comprises the steps of:

the computer system receiving via an interface a selection from a user of a real time comparison of sizes of libraries at a start date and a current time;

the computer system receiving via the interface the start date entered by the user;

the computer system calling an application programming interface (API) in the System i platform, which obtains the sizes of the libraries at the start date and the current time;

the computer system determining differences between the sizes of the libraries at the start date and respective sizes of the libraries at the current time;

the computer system presenting the differences and the sizes of the libraries at the start date and the current time; and the computer system generating and sending a report that includes the differences and the sizes of the libraries at the start date and the current time.

13. The computer system of claim 10, wherein the steps of determining the first and second sizes, and the step of determining the difference between the first and second sizes do not include manually logging onto a system in the System i platform to determine the first and second sizes.

\* \* \* \* \*